United States Patent [19]

Allen et al.

[11] Patent Number: 5,268,684

[45] Date of Patent: Dec. 7, 1993

[54] APPARATUS FOR A NEURAL NETWORK ONE-OUT-OF-N ENCODER/DECODER

[75] Inventors: James Allen, Castro Valley; David G. Stork, Stanford, both of Calif.

[73] Assignees: Ricoh Corporation, Menlo Park, Calif.; Ricoh Company Ltd., Tokyo, Japan

[21] Appl. No.: 817,549

[22] Filed: Jan. 7, 1992

[51] Int. Cl.$^5$ ............................................. H03M 7/00
[52] U.S. Cl. ............................................. 341/75; 341/50
[58] Field of Search .................. 341/75, 50, 102, 103, 341/104, 105

[56] References Cited

U.S. PATENT DOCUMENTS 4,972,187  11/1990  Wecker ..................... 341/95

5,134,396  7/1992  Sirat et al. ..................... 341/50 X

*Primary Examiner*—Sharon D. Logan
*Attorney, Agent, or Firm*—Blakely, Sokoloff, Taylor & Zafman

[57] ABSTRACT

An artificial network for encoding the binary on-state of one-out-of-N inputs, say j, when only one state is on at a time wherein the jth on-state is represented by a suitable output level of an N-input MP type neuron operating in the non-saturated region of the neuron output nonlinearity. A single line transmits the encoded amplitude level signal to a decoder having N single input neural networks. The N outputs of the decoder are in the off-state except for the output corresponding to the active input node of the encoder

12 Claims, 5 Drawing Sheets

APPARATUS FOR A NEURAL NETWORK ONE-OUT-OF-N ENCODER/DECODER

FIELD OF INVENTION

The invention pertains to the field of artificial neurons and neural networks and more specifically to the use of artificial neural techniques for the implementation of a remotely operable one-out-of N selector means or signalling device.

BACKGROUND TO THE INVENTION

Artificial neuron technology is emerging as a viable design alternative for many applications including communications and control. As practical commercial components become increasingly available, solutions to signalling and control problems utilizing these components will be needed.

Remote signalling and/or switching has basic utility in a broad spectrum of application. The current invention is for a novel system using an elementary form of the McCullough-Pitts (MP) neuron for encoding a selector switch position for transmission to a remote location where the received message is decoded so that the same selector position is assumed at the receiver site. The decoder at the receiver is another artificial neural network comprised of known or standard neural network components.

In an article entitled "How to Solve the N Bit Encoder Problem with Just Two Hidden Units" by Leonid Kruglyak in Neural Computation 2, 399–401 (1990), Massachusetts Institute of Technology, Kruglyak implies that a three layer network of the standard feedforward architecture can solve the N input-N output encoder problem with just two hidden units. This structure is i sometimes referred to as a N-2-N encoder/decoder network. Other known prior art required a N-$\log_2$N-N network with hidden $\text{Log}_2$N units to solve the problem, as reported in "Parallel Distributed Processing: Explorations in the Microstructures of Cognition", Rumelhart, D. E. and McClelland, J. L., eds., Vol. 1, Chap. 8, p. 318, MIT Press, Cambridge, Mass.

FIG. 1 shows the structure implied by Kruglyak consisting of encoder unit 10 and decoder unit 20. The encoder unit 10 consists of a N-position slider switch with wiper arm 11 and contacts 13. Wiper arm 11 is connected to a constant voltage source 9 which may, at any time, be applied to only one contact 13 out of a total of N contacts. Each contact 13 is connected to neural processing elements (PE) 17 and 19 by synaptic weighting elements 15. Signals on output lines 14 from PE 17 and 19, represents the encoded switch position (1 through N) of wiper arm 11.

FIG. 2 shows a typical MP neuron and its relationship to the encoder structure 10 of FIG. 1. The inputs (1−N) are applied to input nodes 13 that are each connected to a PE unit by synaptic weighting elements 15 (W1, W2, . . . ,WN). Summing unit 12 adds these weighted inputs together with an appropriate threshold offset 0. The output of summing unit 12 is applied to an output (squashing) nonlinearity 16. Nonlinearity 16 typically has a sigmoidal transfer characteristic. In this manner, PE elements 17 and 19 encode the state of selector switch arm 11 for transmission over output lines 14.

Neuron decoder unit 20 of FIG. 1 consists of N PE 23 units (PE1−N) each having two synaptic connections 21, one to each line of the input line pair 14. The output of the PE 23 units constitutes a N-terminal output array. Upon proper selection of encoder 10 and decoder 20 synaptic weights, output terminals of unit 20 may all be active at various voltage levels. However, the output voltage of the PE unit, $PE_j$, corresponding to the selected jth input active terminal 13, is maximum relative to the other N−1 output terminals.

Although the output of decoder network 20 contains all of the necessary information required to determine which one-out-of-N inputs was activated, it is not fully decoded in the sense that all output terminals 25 will have analog voltages that are representative of their "closeness" to the selected jth input terminal 13 of encoder 10. Additional processing would be required in order to select the jth output terminal 25 having the largest output voltage. A winner-take-all (WTA) network which may be used for this purpose, accepts the N output terminals 25 as its input and activates the one-out-of-N of its output terminals corresponding to the input terminal having the maximum voltage value.

Many possible implementations for the WTA network are known to those skilled in the art. For example, the MAXNET neural network described in the book "Adaptive Pattern Recognition and Neural Networks" by Yoh-Han Pao, section 7.2, p. 173, Addison-Wesley Publishing Company, Inc., 1989. MAXNET uses lateral inhibition to accentuate and select one candidate node, among a set of nodes, that has the greatest output." It is described as a "feedforward Hamming net maximum - likelihood classifier of patterns of binary inputs, corrupted by noise." Although the input patterns in this application are analog voltages, the property of the network is to select the input with the largest magnitude, treating each input as a possible one (on-state) and selecting the largest valued input as the most likely on-state candidate.

Thus, prior art teaches that an N-state encoder/decoder system such as shown in FIG. 1, requires that transmission line unit 14 be comprised of at least two distinct lines. In general, it would be advantageous to reduce the number of transmission channels required particularly if the reduction is achievable at no, or relatively low, cost.

SUMMARY OF THE INVENTION

An artificial network for encoding the binary on-state of one-out-of-N inputs, say j, when only one state is on at a time is described. This jth on-state is represented by a suitable output level of an N-input MP type neuron operating in the non-saturated region of the neuron output nonlinearity. A single line transmits the encoded amplitude level signal to a decoder comprising N single input neural networks. The N outputs of the decoder are in the off-state except for the output corresponding to the active input node of the encoder.

Another object of this invention is to minimize transmission costs. By employing a single transmission line for sending the encoded message significant cost savings may result in a signalling system requiring remote sensing of one on-state out of a multiplicity of inputs.

A further object of this invention is to use neural network technology for its implementation, thereby facilitating the interface with other neural components.

BRIEF DESCRIPTION OF THE DRAWINGS

The novel features believed characteristics of the invention are set forth in the appended claims. However, the invention itself, as well as other features and advantages thereof, will be best understood by reference to the description which follows, read in conjunction with the accompanying drawings, wherein:

DESCRIPTION OF THE PRESENT INVENTION

Figure 1:
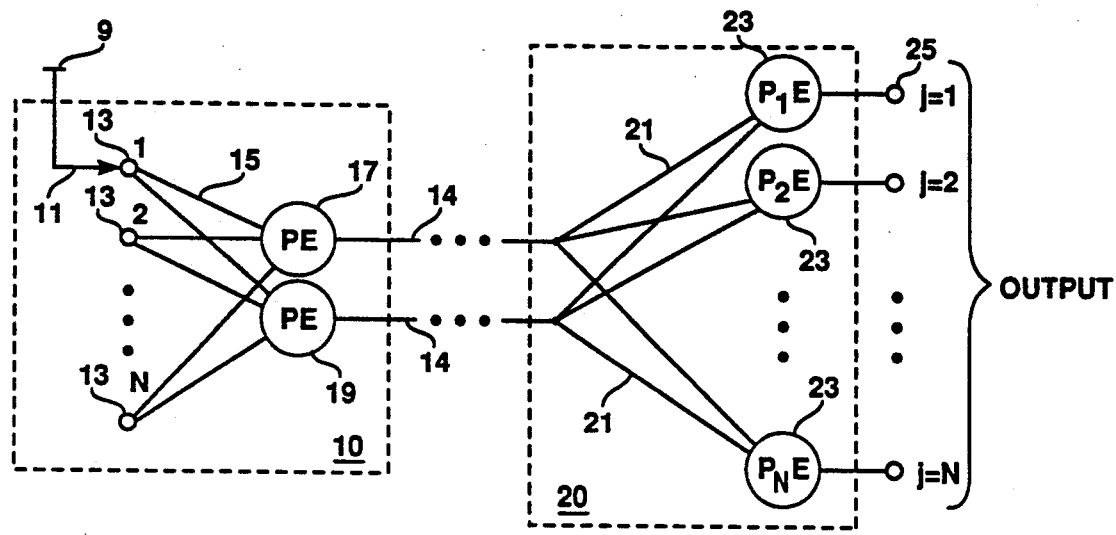
FIG. 1 illustrates a prior-art N-2-N encoder/decoder neural network.

The prior art as shown in FIG. 1 clearly implies that a N-2-N encoder/decoder with two "hidden" neurons, as processing elements 17 and 19 with their synaptic inputs 15 are sometimes referred to, is a minimum type configuration (Kruglyak, op cit). The current invention results in a N-1-N encoder/decoder configuration wherein N input nodes are connected to a single MP type artificial neuron whose output provides an output signal level representative of the input node selected. This single output signal is used by the decoder to activate the one-out-of-N output lines that corresponds to the selected input node.

Figure 3:
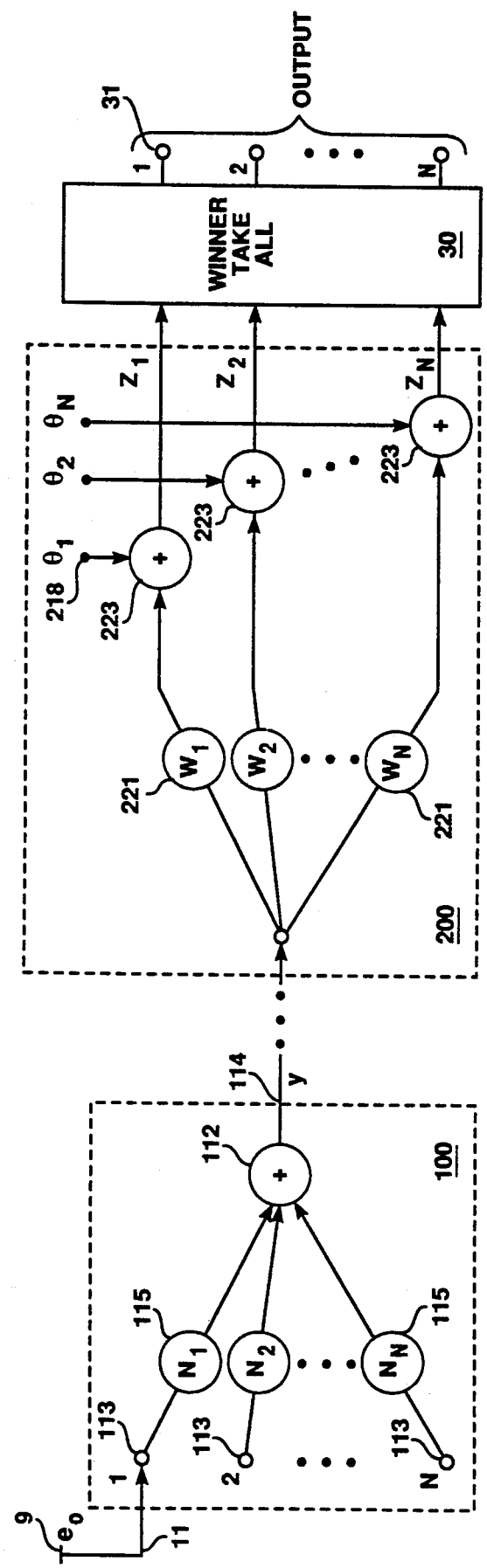
FIG. 3 illustrates the current preferred embodiment of the present invention, a N-1-N encoder/decoder neural network.

FIG. 3 representing the preferred embodiment is comprised of two basic units: encoder 100 and decoder 200. Also, an optional WTA network 30 is shown connected to the N outputs of decoder 200 for uniquely selecting the one-out-of-N output terminals of decoder 200 having the maximum value.

Figure 2:
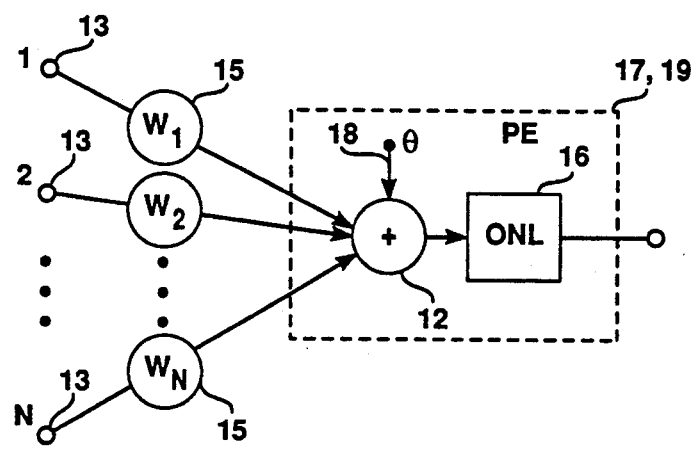
FIG. 2 illustrates a prior-art MP type artificial neuron with N inputs.

Encoder 100 has N input nodes 113, any single one of which may be in contact with selector contact 11. A voltage from source 9 is applied through contact 11 to the selected node 11 3, say the jth node. The source 9 voltage, $e_o$, is applied to the jth synapse 115 characterized by the scaling factor or weight, wj. Each of the N input synapses 115 is applied to the summer 112 input. It should be noted that the sub-structure in encoder 100 comprising weights 115 ($V_{1-N}$) and adder 112 constitute a MP type neuron of the type shown in FIG. 2 operating in the non-saturating, possibly linear region, of the output nonlinear element 16. Thus, except for the selector switch element 113, the encoder comprises a single MP type neuron. The output, y, of encoder 100, applied to transmission means 114 for coupling to the input of decoder 200, may be represented by $$y = e_o * vj \quad (1)$$

If for convenience, $e_o = 1$, then $$y = vj \quad (2)$$

Thus, if each $\{vj\}$ is unique, the value is representative of the jth selected input node.

Decoder 200 receives the encoder output, vj, from element 114 and creates N distinct output values ($z_{1-N}$) by means of N single input MP type neurons each comprising a synaptic weighting element 221 and a PE 223. Each weighting element of the set $\{W_k\}$ is distinct for $k = 1, 2, \ldots, N$. The output of each synapse 221 with weight $W_k$ is applied to a PE 223 element comprising a summing element with a corresponding offset value $\theta_k$. Thus, each synapse 221 and summer of element 223 is equivalent to a single input MP type neuron operating in the non-saturating region of the output nonlinearity (ONL 16 of FIG. 20). The kth output, $z_k$, of decoder 200 may, therefore, be expressed as $$z_k = y * w_k \theta_k = v_j w_k + \theta_k \quad (3)$$

In order for $z_k$ to be a suitable function for driving the WTA 30 network, it must have a maximum value at $k = j$, i.e., when the message vj is received by decoder 200, the jth output terminal must have a value zj that is greater than all of the other $N - 1$ output values, or $$z > z_{k \neq j} \quad (4)$$

This requires that the first derivative of $z_k$ with respect to k, $z'_k$, be equal to zero for $k = j$, or $$z_k' \mid k=j = v_j w'_{k=j} \mid = 0 \quad (5)$$

Hence, $$v_j w'_{k=j} = \theta'_{k=j}$$

Also, the second derivative $w_k''$ must be negative in order to ensure a maximum rather than a minimum, or $$v_j w''_{k=j} < -\theta''_{k=j} \quad (6)$$

These two conditions are sufficient to ensure a maximum value at the proper output terminal of decoder 200. However, depending upon the type of WTA 30 network used, it may be necessary to impose a further constraint. For example, the MAXNET network requires that the maximum value, zj, also be positive, i.e., $zj > 0$, or $$v_j w_{k=j} > -\theta_{k=j} \quad (7)$$

These three conditions specified by expressions (5), (6) and (7) above, can be satisfied by a large variety of functions. For example, consider the encoder/decoder configuration shown in FIG. 3 when the decoder synaptic weights 115 are exponentially scaled uniform increment values, the decoder synaptic weights 221 are linearly scaled uniform increment values, and the offsets 218 are exponentially scaled uniform increment valuesk as follows:

$$v_j = 2^j \quad \text{for} \quad j = 1, 2, \ldots, N$$

$$w_k = \alpha k$$

and $$\theta_k = -2^k$$

so that $$z_k = \alpha 2^j k - 2^k$$

The first condition requires that the first derivative be equal to zero at $k=j$, or $$z'_{k=j} = \alpha 2^j k - 2^k \ln 2 \mid_{k=j} = 0$$

so that $$\alpha = \ln 2$$

Also, because the second derivative is negative at $k=j$, or $$z''_{k=j} = -2^j(ln2)^2 < 0$$

the second condition is also satisfied.

Figure 4:
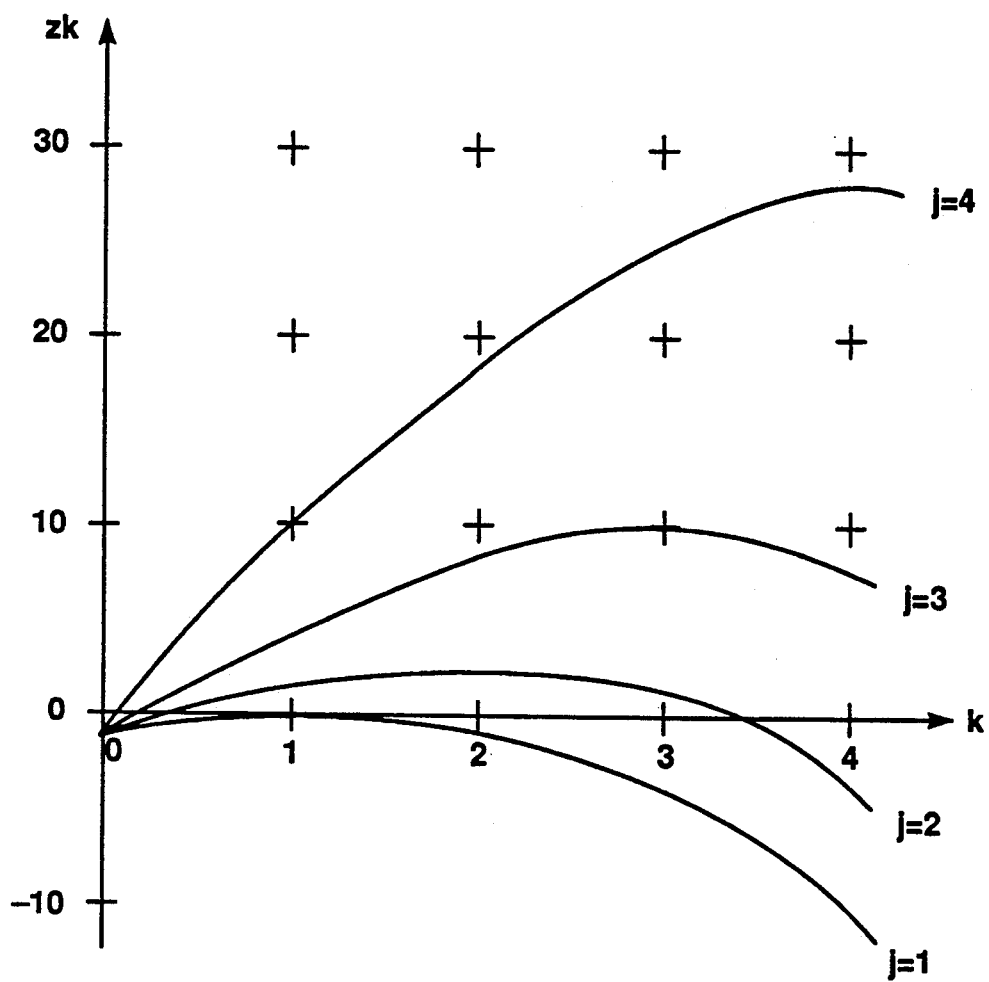
FIG. 4 is a graph showing decoder output characteristics for exponentially weighted encoder synapses, linearly weighted decoder synapses and exponentially weighted decoder offsets.

FIG. 4 is a plot of $z_k$ versus k with $j=1, 2, 3, 4$ as a parameter for $\alpha = \ln 2 \approx 0.7$. It may be seen that the maximum value occurs when $k=j$.

Because the lower curve ($z_k$, $j=1$) is always negative, it may be desirable to impose the third condition requiring $$z_{k,j=1} = \alpha 2^j k + \theta_k \mid_{k,j=1} > 0$$

or $$\theta_1 > -\alpha 2^j k \mid_{k=j=1} = -2 \ln 2 \approx -1.4$$

which is not satisfied when $\theta_1 = -2$. This suggests increasing the value of $\theta_k$ by an amount greater than $2 - \ln 2 \approx 0.6$, say $+1$, so that the new expression for $z_k$ from equation (8) is $$z_k = \alpha 2^j k - 2^k + 1$$

and $z_{k=j-1}$. Note that the addition of a constant equation (8) has not changed the value of the derivatives thus ensuring that all three conditions are simultaneously met. The net result is an upward shift by one unit of the transfer characteristics of FIG. 4 making all output values greater than zero.

Another possible choice of weights and offsets could have linear uniform increment synaptic weights and quadratically scaled decoder offset values, as follows:

$$v_j = j, \quad j = 1, 2, 3, \ldots, N$$

$$w_k = \alpha k$$

and $$\theta_k = -\frac{\alpha k^2}{2}, \quad k = 1, 2, \ldots, N.$$

Figure 5:
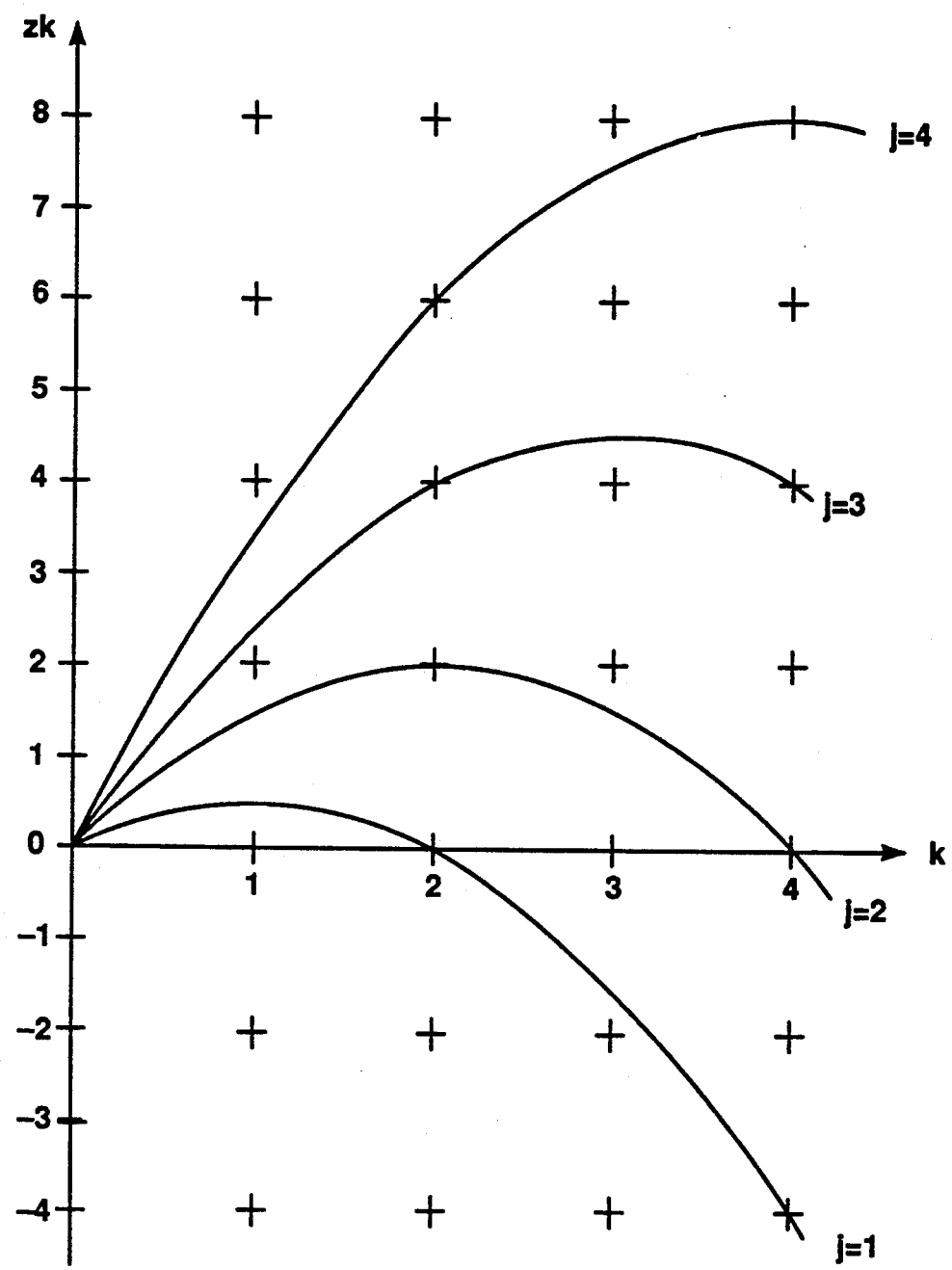
FIG. 5 is a graph showing decoder output characteristics for linearly weighted encoder synapses, linearly weight decoder synapses and quad radically weighted offsets.

Thus, the signal on the kin output tap of decoder 200 would be representative of $$z_k = \alpha k \left( j - \frac{k}{2} \right)$$

which satisfies the three conditions of expressions (5), (6) and (7) and is plotted in FIG. 5 with j as the parameter. In this case $\alpha = 1$, but could assume any reasonable positive value that ensures non-saturating operation of the neuron's output non-linearity. A further advantage of the functional of equation (14) over that of equation (13) is the more restricted range of output variable, $y_k$, that must be accommodated. Equation (14) is a quadratic rather than an exponential expression as in equation (13).

Figure 6:
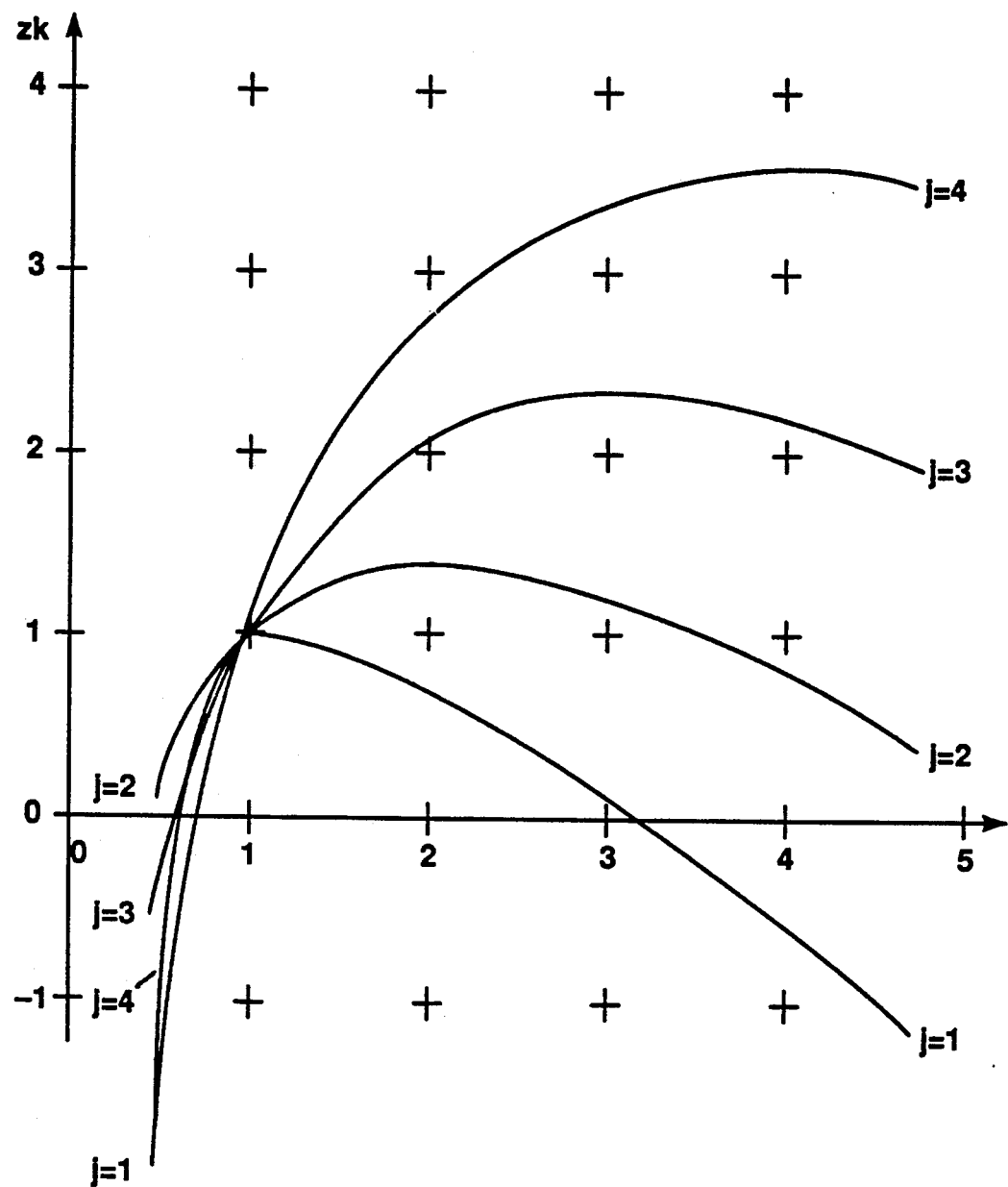
FIG. 6 is a graph showing decoder output characteristics for linearly weighted encoder synapses, logarithmically weighted decoder synapses and linear weighted decoder offsets.

A further example obtains when vi is linear with respect to increments in index j, $w_k$ is logarithmically scaled with respect to index k, and $\theta_k$ is linear with respect to index k, as follows:

$$v_j = j \quad j = 1, 2, \ldots, N$$

$$w_k = \ln k$$
$$\theta_k = (k - \alpha) \quad k = 1, 2, \ldots, N$$

so that $$z_k = j \ln k - (k - \alpha)$$

where $\alpha$ is an arbitrary constant. As shown in FIG. 6, for $\alpha = 2$, equation (15) satisfies all three conditions.

To those skilled in the art of neural nets and neural computing, other expressions satisfying the conditions in expressions (5), (6) and (7) may be found using the elementary mathematical tools invoked above.

What is claimed is:

1. A one-out-of-N neural network encoder and decoder system comprising:
   (a) a set of N input terminals for designating one-out-of-N input states by applying a signal level to one terminal of the set of N input terminals;
   (b) encoding means connected to the set of N input terminals for producing, at an output terminal, a single multilevel output signal having N possible unique levels, each unique level corresponding to one of the designated one-out-of-N input states; and
   (c) docoding means with an input terminal coupled to the encoder means output terminal for receiving a signal representative of the level of the encoding means single output signal, the decoding means having N output terminals, each of the output terminals corresponding to one of the set of N input terminals connected to the encoding means, for decoding the received signal by generating, at the N output terminals, N signals such that the output terminal that corresponds to the designated input state has a value greater than any of the other $N-1$ output signal level values.

2. A one-out-of-N neural network encoder and decoder system comprising:
   (a) a set of N input terminals for designating one-out-of-N input states by applying a signal level to one terminal of the set of N input terminals:
   (b) encoding means comprising an N-input artificial neuron,, the artificial neuron N-inputs connected to the set of N input terminals for producing at the artificial neuron output terminal, a single multilevel output signal having N possible unique levels, each unique level corresponding to one of the designated one-out-of-N input states; and
   (c) decoding means comprising N single-input artificial neurons with each of the N single-inputs coupled to the encoding means output terminal for receiving a signal representative of the encoding means output signal level, each of the N single-input neurons having an offset input terminal and an output terminal, each of the output terminals corresponding to one of the set of N input terminals connected to the encoding means for decoding the received signal by generating, at the N output terminals, N signal levels such that the output terminal that corresponds to the designated input state has a value greater than any of the other $N-1$ output signal level values.

3. The system of claim 2 wherein:
(a) the N-input artificial neuron of the encoding means has exponentially scaled uniform increment synaptic weights;
(b) the N single-input artificial neurons of the decoding means have linearly scaled uniform increment synaptic weights; and
(c) the offset input terminals of the N single-input artificial neurons have exponentially scaled uniform increment offset values applied.

4. The system of claim 2 wherein:
(a) the N-input artificial neuron of the encoding means has linearly scaled uniform increment synaptic weights;
(b) the N single-input artificial neurons of the decoding means have linearly scaled uniform increment synaptic weights; and
(c) the offset input terminals of the N single-input artificial neurons have quadratically scaled uniform increment offset values applied.

5. The system of claim 2 wherein:
(a) the N-input artificial neuron of the encoding means has linearly scaled uniform increment synaptic weights;
(b) the N single-input artificial neurons of the decoding means have logarithmically scaled uniform increment synaptic weights; and
(c) the offset input terminals of the N single-input artificial neurons have linearly scaled uniform increment offset values applied.

6. The system of claim 2 wherein:
(a) The N-input artificial neuron has a set of N synaptic weights $(v_1, v_2, \ldots, v_j, \ldots, v_N)$, one for each of the N input states;
(b) the $k^{th}$ neuron of the N single-input artificial neurons has a synaptic weight value, $w_k$, and an offset value, $\theta_k$, where $k = 1, 2, \ldots, N$, for producing at the output of the $k^{th}$ single-input artificial neuron a signal value $z_k$, proportional to the value given by $$z_k = v_j w_k' + \theta_k$$

such that a maximum decoder output value occurs at the decoder output terminal k that corresponds to the designated input terminal j, (k=j).

7. The system of claim 3, further comprising an output classifier means connected to the N output terminals of the decoding means, the output classifier means having N output terminals, only one output terminal being active at a time, the active output terminal being selected to correspond to the decoding means output terminal having the greatest output value.

8. The system of claim 4, further comprising an output classifier means connected to the N output terminals of the decoding means, the output classifier means having N output terminals, only one output terminal being active at a time, the active output terminal being selected to correspond to the decoding means output terminal having the greatest output value.

9. The system of claim 5, further comprising an output classifier means connected to the N output terminals of the decoding means, the output classifier means having N output terminals, only one output terminal being active at a time, the active output terminal being selected to correspond to the decoding means output terminal having the greatest output value.

10. The system of claim 7 wherein the output classifier means is a feedforward Hamming-net maximum-likelihood classifier.

11. The system of claim 8 wherein the output classifier means is a feedforward Hamming-net maximum-likelihood classifier.

12. The system of claim 9 wherein the output classifier means is a feedforward Hamming-net maximum-likelihood classifier.

* * * * *